(12) United States Patent
Peterson et al.

(10) Patent No.: US 10,905,143 B2
(45) Date of Patent: Feb. 2, 2021

(54) GRANULAR MATERIAL PROCESSOR (71) Applicant: Intelligent Malt, LLC, Fargo, ND (US)

(72) Inventors: Tyler Peterson, Dubuque, IA (US);
Peder Pederson, West Fargo, ND (US);
Garrett Maurer, Moorhead, MN (US);
Chris Anderson, Moorhead, MN (US);
Katrina Christiansen, Jamestown, ND (US)

(73) Assignee: Intelligent Malt, LLC, Fargo, ND (US)

( * ) Notice: Subject to any disclaimer, the term of this patent is extended or adjusted under 35 U.S.C. 154(b) by 234 days.

(21) Appl. No.: 15/687,469

(22) Filed: Aug. 26, 2017

(65) Prior Publication Data
US 2019/0059424 A1 Feb. 28, 2019

(51) Int. Cl.
*A23L 7/20* (2016.01)
*C12C 1/15* (2006.01)
*C12C 1/13* (2006.01)
*C12C 1/067* (2006.01)

(52) U.S. Cl.
CPC .............. *A23L 7/20* (2016.08); *C12C 1/067* (2013.01); *C12C 1/13* (2013.01); *C12C 1/15* (2013.01)

(58) Field of Classification Search
CPC .. C12C 1/067; C12C 1/15; C12C 1/13; A23L 7/20
USPC .................................. 99/467, 276, 277, 278
See application file for complete search history.

(56) References Cited

U.S. PATENT DOCUMENTS

| 3,450,600 | A  | * | 6/1969  | Graham      | C12C 1/15   |
|           |    |   |         |             | 435/291.5   |
| 3,541,687 | A  | * | 11/1970 | Peters      | A01J 25/06  |
|           |    |   |         |             | 99/453      |
| 2003/0056244 | A1 | * | 3/2003 | Huang       | B82Y 30/00  |
|           |    |   |         |             | 800/278     |
| 2012/0324789 | A1 | * | 12/2012 | Pease      | A01G 31/00  |
|           |    |   |         |             | 47/62 N     |
| 2014/0250717 | A1 | * | 9/2014  | Bloemendaal | G01N 27/223 |
|           |    |   |         |             | 34/487      |
| 2017/0305657 | A1 | * | 10/2017 | Imhof      | B65D 88/40  |
| 2018/0305142 | A1 | * | 10/2018 | Belcher    | B65G 65/30  |
| 2018/0354770 | A1 | * | 12/2018 | Cacciatore | B67C 3/286  |

FOREIGN PATENT DOCUMENTS

| CN | 202190700 U      |   | 4/2012 |           |
|----|------------------|---|--------|-----------|
| EP | 2258823 B1       |   | 4/2013 |           |
| WO | WO-2017091221 A1 | * | 6/2017 | B65D 88/26 |

OTHER PUBLICATIONS

Machine translation of EP2258823B1, retrieved Oct. 10, 2017, 2 pgs.
Machine translation of CN202190700U, retrieved Oct. 10, 2017, 13 pgs.

* cited by examiner

Primary Examiner — Dana Ross
Assistant Examiner — Kuangyue Chen
(74) Attorney, Agent, or Firm — Danielson Legal LLC (57) ABSTRACT

Methods and systems for malting a granular material. Systems in accordance with various embodiments include a first tank, a second tank positioned below the first tank, and a transfer device operably positioned between the first tank and the second tank. The transfer device includes a plurality of pipes for transferring material from the first tank to the second tank.

19 Claims, 7 Drawing Sheets

GRANULAR MATERIAL PROCESSOR

TECHNICAL FIELD

Embodiments described herein generally relate to systems and methods for processing granular material and, more particularly but not exclusively, to systems and methods for malting cereal grains such as barley.

BACKGROUND

Malting is a method of turning granular material such as cereal grains into malt. Malting generally begins once a particular material is in a tank and has been submerged in water for a predetermined amount of time.

After steeping, the material is moved to a different tank for germination and kilning. In this step the material begins to grow and is dried. During this drying stage, it is important that the material is agitated (i.e., stirred) in order to avoid heating or matting. If a batch mats, it will spoil and become unusable.

Existing techniques for malting generally involve multiple separate tanks that are positioned next to one another. To transfer material from one tank to another, the tank configuration of these existing processes requires a transportation device such as a conveyor belt to move the material from one tank to another. This layout can be inefficient due to the time required to transfer the material to a different tank, the need for human interaction with the machines, and the potential for mistakes that can occur due to human error.

A need exists, therefore, for malting systems and methods that overcome the above disadvantages of existing systems and methods.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a malting system. The system includes a first tank, a second tank positioned below the first tank, and a transfer device operably positioned between the first tank and the second tank, wherein the transfer device includes a plurality of pipes for transferring material from the first tank to the second tank.

In some embodiments, the first tank includes an ingress pipe for receiving water and a material inlet for receiving a granular material.

In some embodiments, the system further includes an autonomous valve operably connected to the first tank for removing water from the first tank after a predetermined amount of time.

In some embodiments, the second tank includes a perforated floor portion. In some embodiments, the system further includes at least one fan for pushing air through the perforated floor portion. In some embodiments, the system further includes a heat exchanger providing heat through the perforated floor portion to dry the granular material in the second tank. In some embodiments, the system further includes a grain removal auger positioned below the perforated floor portion.

In some embodiments, the system further includes an agitator assembly operably positioned in the second tank, wherein the agitator assembly includes a vertical shaft, at least one arm extending horizontally from the vertical shaft; and at least one knife hanging from the at least one arm. In some embodiments, the agitator assembly further includes at least one wire extending between two knives.

In some embodiments, the transfer devices further includes a valve device configured to control the transfer of the material from the first tank to the second tank.

In some embodiments, the system further includes a spray nozzle operably positioned with respect to the first tank for injecting at least one of water and cleaning chemicals into the first tank.

In some embodiments, the transfer device uses gravity to transfer the material from the first tank to the second tank.

According to another aspect, embodiments relate to a method of malting a granular material. The method includes loading the first tank discussed above with a granular material, soaking the granular material for a predetermined period of time, transferring the granular material to the second tank discussed above using the transfer device; and drying the granular material in the second tank.

In some embodiments, the method further includes agitating the granular material in the second tank using the agitator assembly discussed above.

In some embodiments, the method further includes applying compressed air to the first tank.

In some embodiments, the method further includes removing the dried granular material from the second tank using a grain removal auger.

In some embodiments, drying the granular material in the second tank includes supplying heat to the second tank using a heat exchanger.

In some embodiments, the method further includes spraying the first tank with a cleaning fluid.

In some embodiments, the method further includes pushing air through a perforated floor of the second tank.

In some embodiments, the method further includes removing water from the first tank after soaking.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments described herein are directed towards a granular material food processing system and method. The system in accordance with various embodiments includes two tanks with shallow beds that are stacked above each other. The upper tank may be used for steeping material and may be referred to as a "steep tank." During steeping, material such as barley may be placed in the upper tank and submerged in water for a period of time (e.g., a number of hours). Then, the material may be moved to the lower tank for germination, kilning, and drying.

Figure 1:
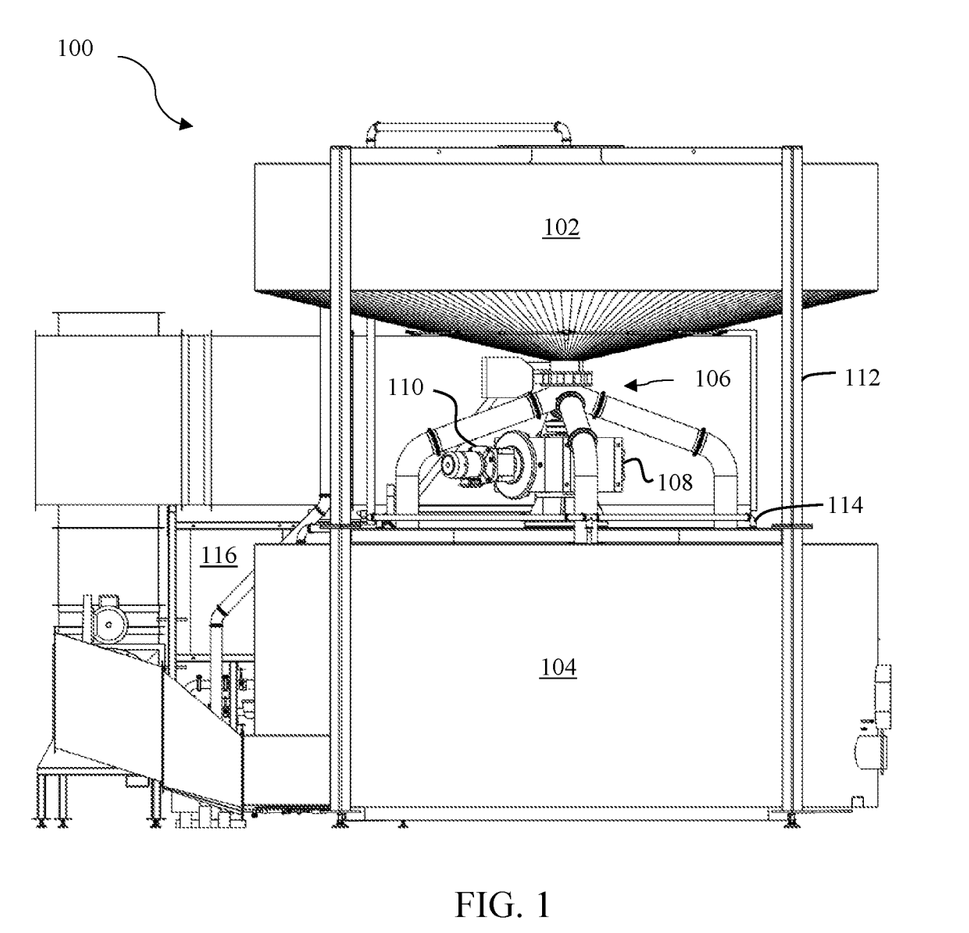
FIG. 1 illustrates a malting system in accordance with one embodiment.

FIG. 1 illustrates a system 100 that may be used for malting as well as other processes in accordance with various embodiments. The system 100 is hereinafter referred to as a "malting system 100" and is described in conjunction with a malting process. However, it is to be understood that the system 100 may be used to perform a variety of different processes in addition to or in lieu of malting. The malting system 100, as well as components therein, may be operated autonomously, semi-autonomously, and/or manually.

This malting system 100 may comprise two tanks: an upper tank 102 and a lower tank 104 below the upper tank 102. The upper and lower tanks 102 and 104, respectively, may include shallow tank beds that are stacked above each other such that their centers at least approximately line up with each other. Other embodiments may include additional tanks positioned vertically or horizontally with respect to these two tanks 102, 104.

The system 100 may further include a grain transfer system 106 positioned and configured to transfer material from the upper tank 102 to the lower tank 104. The system 100 may also include a gearbox 108 and a motor 110 to drive an agitator (discussed below) operably positioned in the lower tank 104.

The upper tank 102 may be supported and held in place by a series of support tubes 112 that run parallel to the vertical axis of the upper and lower tanks. The gearbox 108 and motor 110 may be supported by a series of horizontal load-bearing tubes 114, for example.

In use, the upper tank 102 may be used for steeping barley by submerging the barley in water therein. Barley may be placed in the upper tank 102 through an upper tank inlet while water is brought into the upper tank 102 via a water inlet.

After steeping, water may be removed from the upper tank 102 using an actuating water valve. The granular material may then move through an outlet of the upper tank 102, through the grain transfer system 106, and into the lower tank 104.

The malting system 100 may also be operably connected to or otherwise configured with a heating, ventilation, and air condition (HVAC) system 116. The HVAC system 116 has two primary purposes. The first is to create and maintain an environment that promotes germination by forcing moist air through the grain bed of the lower tank 104 and removing $CO_2$ from the lower tank 104. A fan (not pictured) may push up to 3000 CFM of moist air through the grain in the lower tank 104.

The second purpose is to, after germination, dry out the grain and cure the grain to a specified temperature. These steps may be performed using one or more fans and heat exchangers. The HVAC system 116 can produce air temperatures of 255 degrees Fahrenheit if the air is recirculated through the system 116 rather than pulling in fresh air from outside a facility and exhausting that air out of the facility.

In both cases, the air flows into the same ductwork interface, also called the HVAC inlet, and into the lower tank 104. The air may flow through the perforated false bottom floor of the lower tank 104 (discussed below) and then out of the same exhaust interface.

The HVAC system 116 may take a form other than that set forth in the current description. The HVAC system 116 can have as much power and ducting to supply heat to as many malting systems as needed simultaneously. The HVAC system 116 may have temperature, humidity, and pressure sensors placed throughout the ducting to gather relevant data and send it back to a centralized computing system and/or a mobile device.

Figure 2:
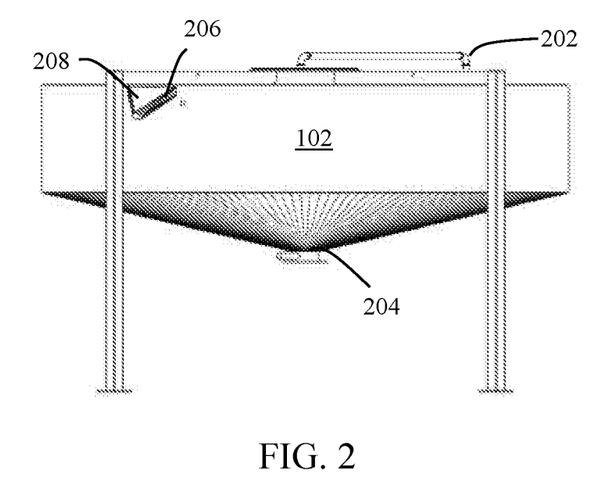
FIG. 2 illustrates the upper tank of FIG. 1 in accordance with one embodiment.

FIG. 2 illustrates the upper tank 102 of FIG. 1 in accordance with one embodiment. The upper tank 102 may be made from stainless steel. Once the barley is in the upper tank 102, the steeping process may begin by completely immersing the barley in water. During the steeping phase, compressed air may be applied to the upper tank 102 through an air manifold to control the oxygen content in the tank.

The upper tank 102 may be configured with at least two different types of sensor devices. First, the upper tank 102 may include one or more flow sensors to monitor the water fill and the water drain. Second, the upper tank 102 may include water level sensors to measure water level within the upper tank 102. These water level sensors may therefore help determine whether immersion has occurred.

Figure 3A:
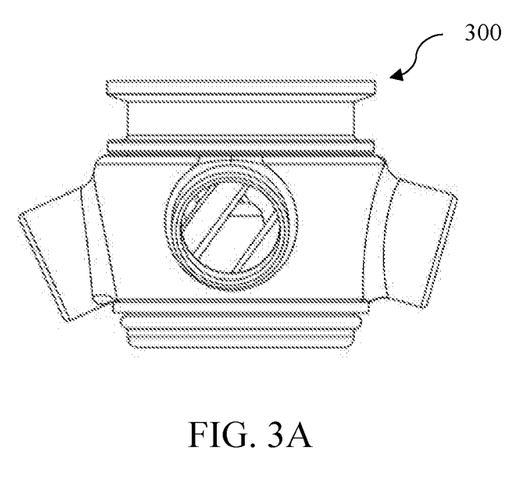
FIGS. 3A and B illustrate a spray nozzle in accordance with one embodiment.
Figure 3B:
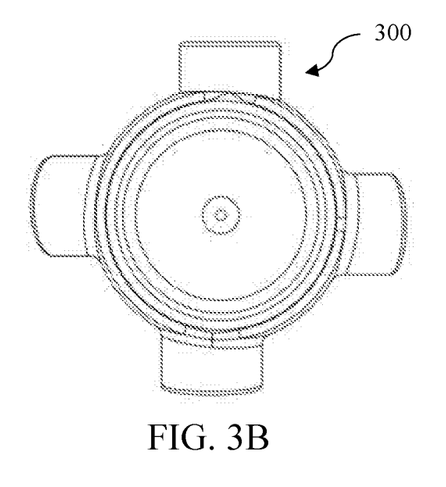

FIGS. 3A and B illustrate a front view and a top view, respectively, of a spray nozzle 300 that may be positioned in or otherwise near the top portion of the upper tank 102. The spray nozzle 300 has two functions. First the spray nozzle 300 may spray water into the upper tank 102 to help move grain through the grain transfer system 106.

Second, the spray nozzle 300 may act as a cleaning nozzle. That is, the spray nozzle 300 may work on a closed circuit system and may spray water and/or cleaning chemicals or fluids into the upper tank 102 once the upper tank 102 is empty (e.g., once the water and barley are removed).

The upper tank 102 has two methods of removing water. The first method is through an actuated water valve that controls the flow of water out of the upper tank 102. The second method is the water overflow outlet 202 of FIG. 2 at the top of the upper tank 102. The water overflow outlet 202 allows for water to leave the system 100 in case of malfunction or for other purposes such as removing any potential contaminants therein. FIG. 2 also illustrates an ingress pipe 206 for receiving water and a material inlet 208 for receiving a granular material.

Figure 4:
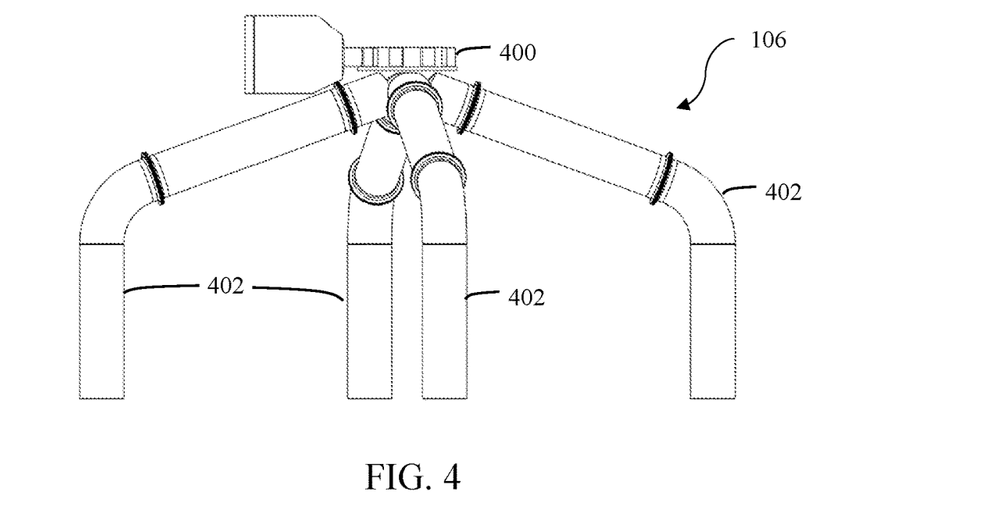
FIG. 4 illustrate the grain transfer device of FIG. 1 in accordance with one embodiment.

Once the steeping is complete, the grain may move through the upper tank outlet 204 and into the grain transfer system 106. FIG. 4 illustrates the grain transfer system 106 of FIG. 1 in accordance with one embodiment. The grain transfer system 106 may include an autonomous valve 400 that is positioned directly below the upper tank 102 and operably connected to the upper tank outlet 204 of FIG. 2. The autonomous valve 400 may control the flow of grain out of the upper tank 102. The grain transfer system 106 may also include a plurality of (e.g., four) transfer pipes 402 for transferring grain into the lower tank 104. The material may be transferred through the transfer system 106 at least partially by gravity, for example.

As mentioned previously, existing processing systems and methods generally include a conveyor belt to transfer material from one tank to another. This is undesirable, however, as conveyor belts generally load material into a tank at a single entry point on the side of the tank. This can lead to uneven distribution of material in the tank.

The grain transfer system 106 overcomes this disadvantage of existing conveyor belt systems. By using a plurality of transfer pipes such as pipes 402 of FIG. 3, the grain transfer system 106 more evenly spreads material on the bed of the lower tank 104.

The grain transfer system 106, namely, the autonomous valve 400 may be electrically and/or mechanically activated by a control device. For example, if the sensors configured with the upper tank 102 detect that the water is drained from the upper tank 102 (and therefore that steeping is complete), the control device may signal the autonomous valve 400 to open to allow grain through the grain transfer system 106 and into the lower tank 104. Similarly, the autonomous valve 106 may be set to open/close on a timer or at predetermined times.

Figure 5:
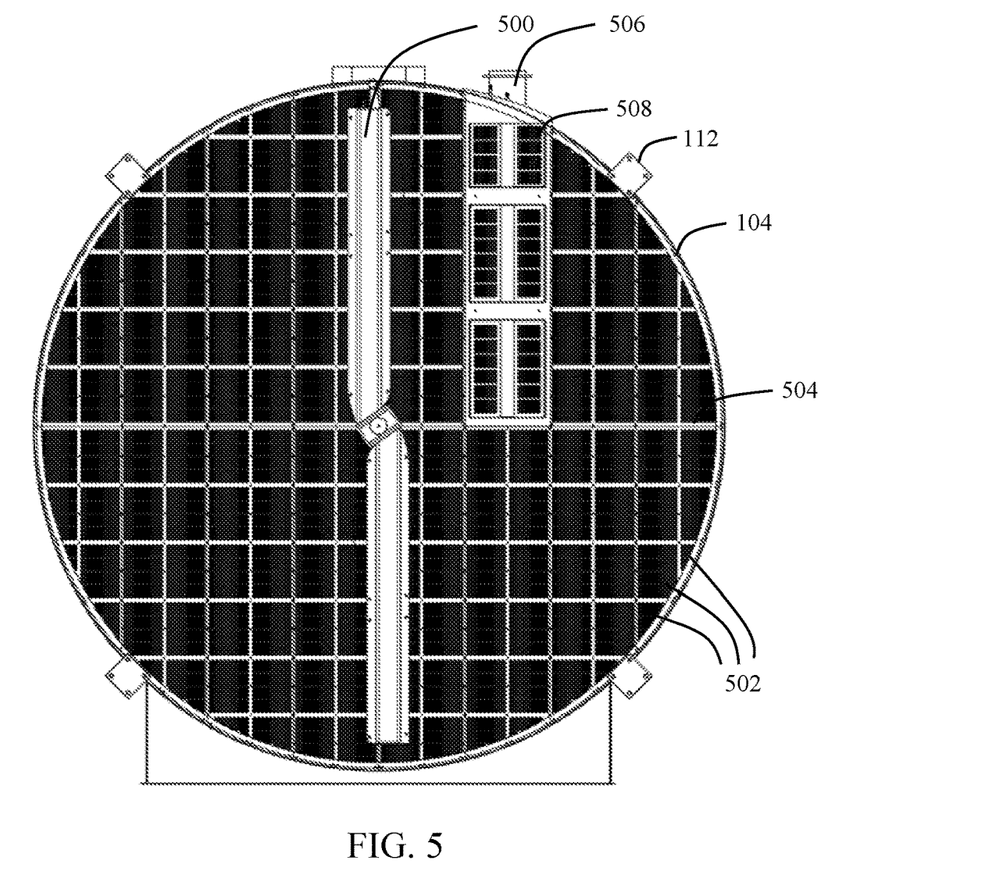
FIG. 5 illustrates a perforated floor portion of the lower tank of FIG. 1 in accordance with one embodiment.

Once in the lower tank 104, the material may undergo any required germination, kilning, and drying steps. FIG. 5 illustrates a top-down view of the interior of the lower tank 104. The lower tank 104 may be capable of holding grain and sluice water that is transferred from the upper tank 102.

Figure 6:
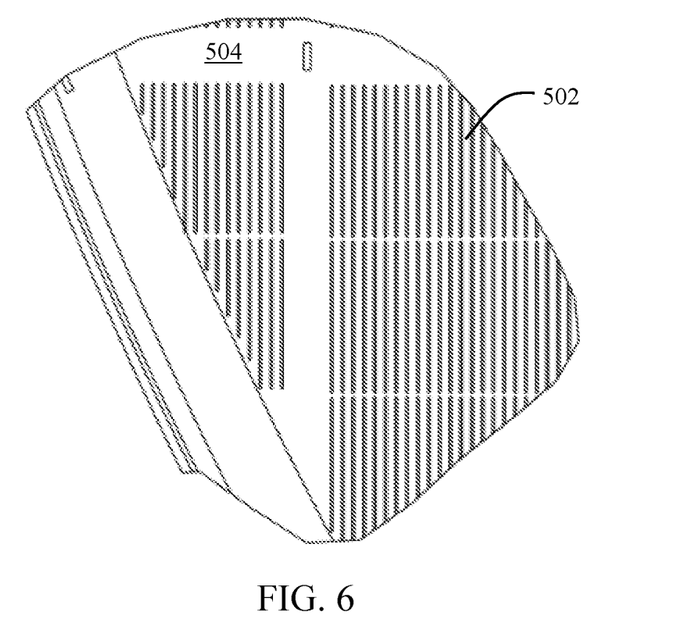
FIG. 6 illustrates a detailed view of the perforated floor portion of FIG. 5 in accordance with one embodiment.

As seen in FIG. 5, the lower tank 104 may include a plurality of perforations 502 (illustrated as the darkened areas) that make up or are otherwise part of a false bottom floor 504. FIG. 6, for example, illustrates a more detailed view of the false bottom floor 504 of the lower tank 104 with the perforations 502.

The lower tank 104 is also illustrated in FIG. 5 as including a grain removal auger 506 that is operably positioned below the false bottom floor 504. The grain removal auger 506 also has perforations 508 thereon to prevent grain from falling through as it leaves the lower tank 104. Although not shown in FIG. 5 or FIG. 6, the grain removal auger 506 may include a cover portion that sits atop of the auger 506 when the auger 506 is not in use.

Figure 7:
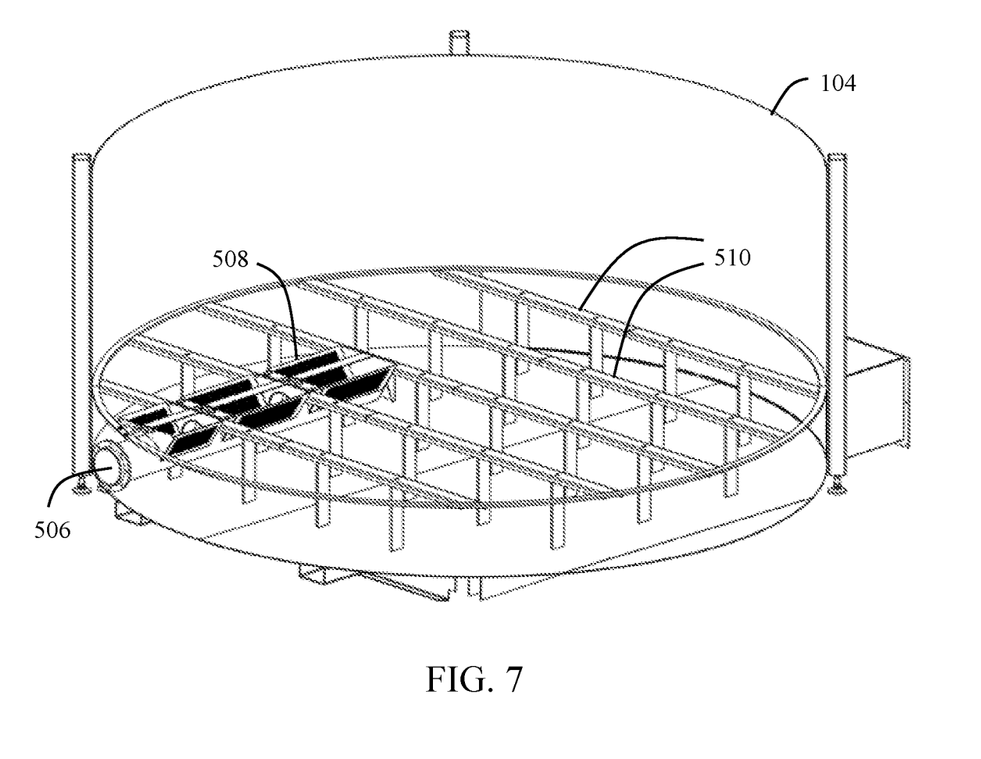
FIG. 7 illustrates a perspective view of the lower tank of FIG. 1 in accordance with one embodiment.

FIG. 7 illustrates a perspective view of the interior of the lower tank 104 and the auger 506. In this illustration, the false floor 504 of FIG. 5 is removed thereby showing a plurality of floor supports 510. The floor supports 510, as well as the false bottom floor 504 allow water to drain from the barley while allowing air to move upwards into the lower tank 104 through the perforations 506 during germination and kilning. As air enters underneath the barley, it flows evenly through the product to ensure proper germination, kilning, and drying.

Accordingly, the perforated false bottom floor 504 provides the necessary conditions for air flow to be dispersed upwards through the barley. The lower tank 104 may have an inlet connected to the HVAC system 116 for air to enter and move up through the floor 504. The perforations ensure that air can move upwards but that the barley cannot fall through the perforated spaces. The lower tank 104 may also include fogging nozzles (not shown) placed in the ductwork of the HVAC system 116 that may control the humidity at desired levels inside the lower tank 104.

An unloading arm may be used in conjunction with a grain removal auger 506 to dispense the final product from the lower tank 104. Once the drying phase is complete, an agitator (discussed below) will continue to rotate as the unloading arm slowly pushes the grain to the grain removal auger 506. The unloading arm may be a stainless steel metal portion that has a silicone rubber extension attached to it.

Figure 8:
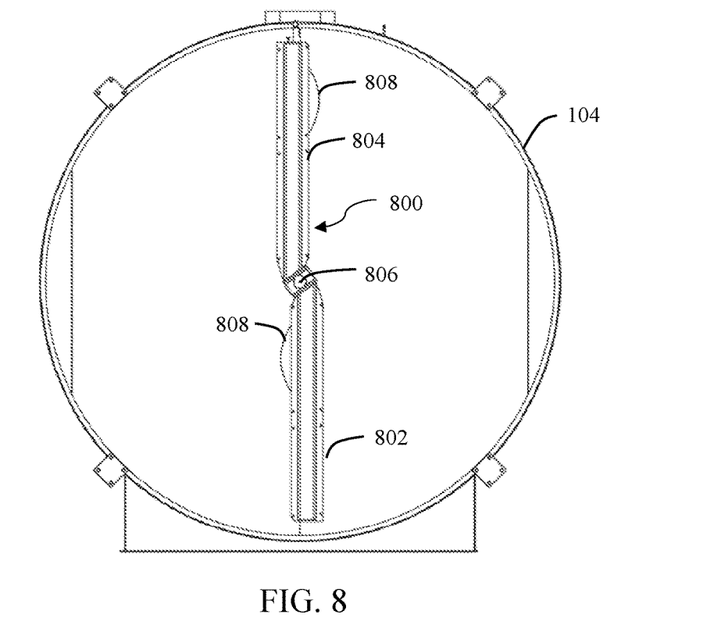
FIG. 8 illustrates a top view of an agitator assembly in accordance with one embodiment.

FIG. 8 illustrates a top view of the lower tank 104 with an agitator assembly 800 operably positioned therein. As can be seen from this top view, the agitator 800 includes arms 802 and 804 that each extend from the shaft 806. As the arms 802 and 804 rotate about the shaft 806, agitator elements 810 pass through or otherwise agitate the material within the lower tank 104.

Figure 9:
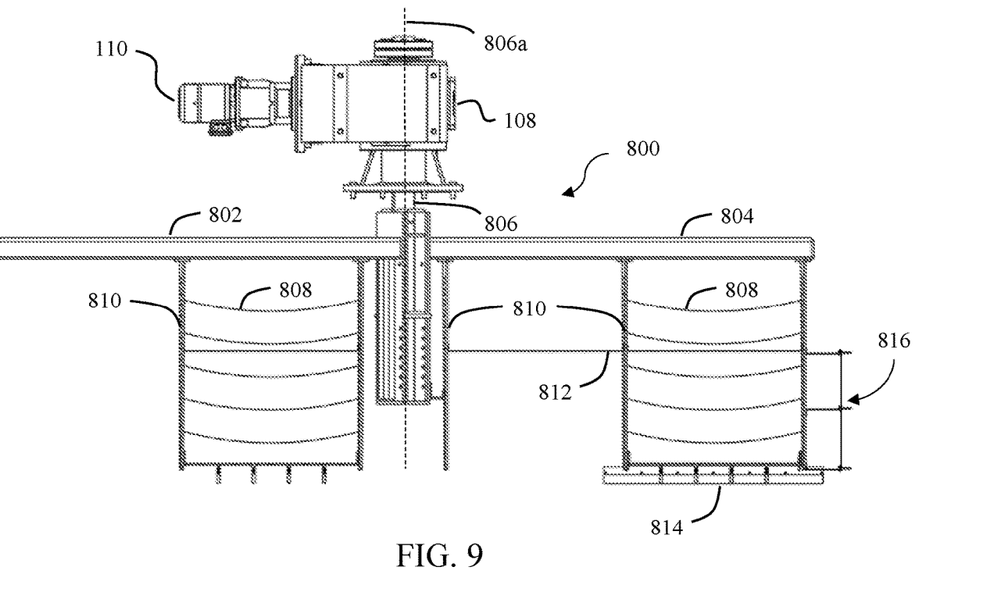
FIG. 9 illustrates a side view of the agitator assembly of FIG. 8 in accordance with one embodiment.

FIG. 9 illustrates a side view of the agitator assembly 800 of FIG. 8. As seen in FIG. 9, the agitator 800 includes arms 802 and 804 extending from the center shaft 806. Arms 802 and 804 may each include one or more agitator elements 808 that extend from one or more knives 810 that extend downward from the arms 802 and 804.

Although the agitator elements 808 are illustrated as wires, it is contemplated that other types of agitator elements may be used. For example, the agitator elements 808 may be configured as a chain, cable, a rigid material, or the like. The exact configuration of the agitator element(s) may vary as long as they can agitate material as desired.

As seen in FIG. 9, the knife or knives 810 may hang from or otherwise be affixed to the arms 802 and 804 and extend substantially orthogonally from the arm at a downward angle (i.e., into the lower tank 104). The knives 810 therefore serve two functions. First, the knives 810 themselves function as agitators that break up the material as they pass through the material. Second, the knives 810 may hold or otherwise support the agitator elements 808 that also pass through and agitate the material.

In use, the gearbox 108 and motor 110 power the shaft 806 to rotate about its axis 806a in the lower tank 104. As the shaft 806 rotates, the arms 802 and 804 rotate around the shaft 806, thereby moving the knives 810 in a circular motion through the material in the lower tank 104. This motion of the knives 810, as well as the motion of the agitator elements 808, therefore agitates the material in the lower tank 104.

The purpose of the agitator 800 is to move through the barley to prevent any matting or excessive hot spots from occurring. In this particular embodiment, there are two arms 802 and 804 that are placed on opposite sides of the center of the shaft 806. The number of arms, as well as the number of components attached to each arm may vary.

For example, arm 804 has three knives 810 with a middle support 812 extending between two of the knives 810. The middle and distal knives have agitator elements 808 (e.g., wires) strung through the knives 810 to create agitation on the outer half of the grain. In FIG. 9, the agitator elements 808 are shown slightly bowed, which is their position when the agitator 800 is not in motion and the lower tank 104 is empty.

The agitator 800 may also include a bottom rake 814 positioned towards the bottom of the knives 810. The bottom rake 814 may function as a cleaning implement as well as support for the knife structure.

Figure 10:
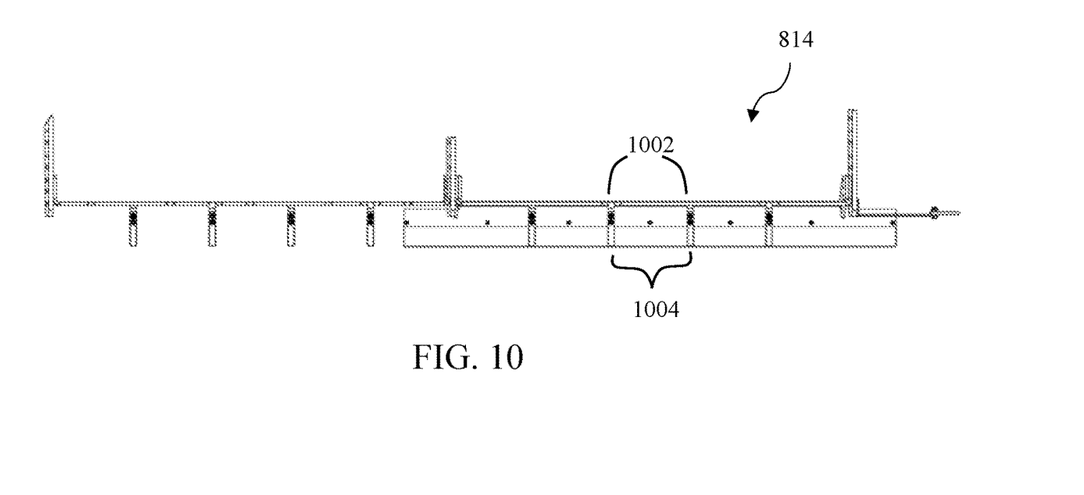
FIG. 10 illustrates the bottom rake of FIG. 9 in accordance with one embodiment.

FIG. 10 illustrates the bottom rake 814 of FIG. 9 in more detail. The bottom rake(s) 814 may include a plurality of staggered finger portions 1002. These finger portions 1002 may be made out of stainless steel, for example. Each finger portion 1002 may further include a silicone pad 1004 secured thereon. The silicone pads 1004 protect the floor 504 of the lower tank 104 and may compensate for tolerances in tank height and any non-flat portions of the tank floor 504.

The silicon pads 1004 may also function as cleaning mechanisms for the lower tank 104. For example, as the agitator 800 turns, the silicon pads may prevent barley from accumulating on the floor 504.

An unloading arm connects to each bottom rake 814 through hinges (not shown). The hinges allow the unloading arm to be in a vertical or horizontal position during use. During the germination phase, the arm will be in a horizontal position where it will float up and avoid increasing drag forces. When the unloading arm is in a vertical position, it sits directly behind the finger portions 1002 and silicone pads 1004 to push the dry grain into the grain removal auger 506 of FIG. 5.

Figure 11:
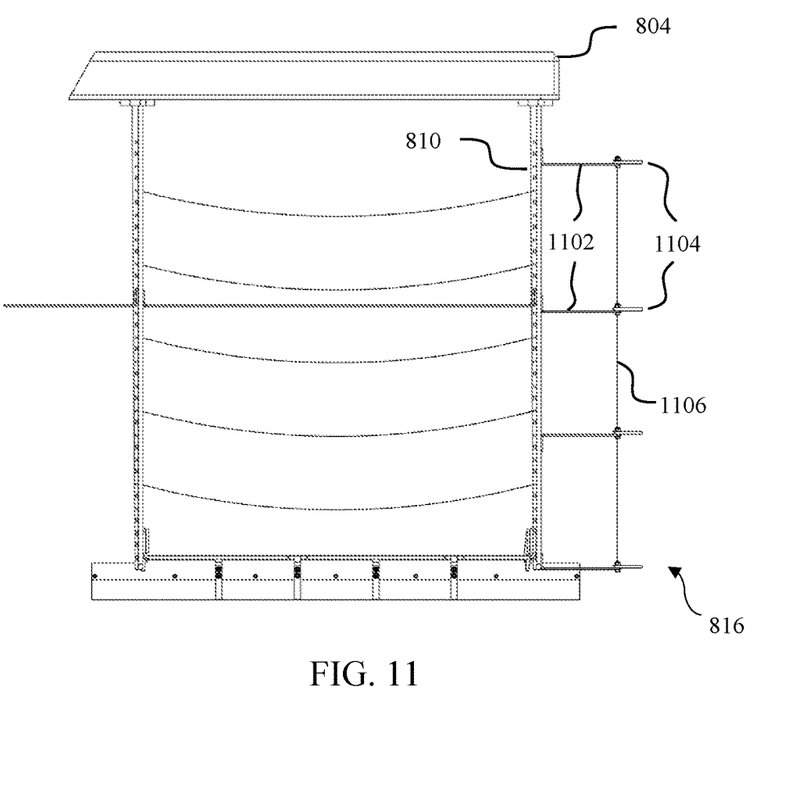
FIG. 11 illustrates the side rake of FIG. 9 in accordance with one embodiment.

Referring back to FIG. 9, the agitator 800 may also include a side rake 816 to prevent matting of barley and to provide flexibility to accommodate the interior of the lower tank 104. FIG. 11 illustrates the side rake 816 that is attached to the arm 804 of FIG. 9. The side rake 816 comprises multiple L-shaped brackets 1102 that each include a silicone pad 1104 secured thereon. Similar to the bottom rake 814, the side rake 816 functions as a cleaning mechanism. The elasticity of the silicone pads 1104 compensates for tolerances in tank diameter and out-of-roundness of the tank wall. A wire 1106 may run vertically through each layer of the side rake 816 to bring the rake 816 out to the edge of the tank 104 as far as possible while producing as little load as possible.

Figure 12:
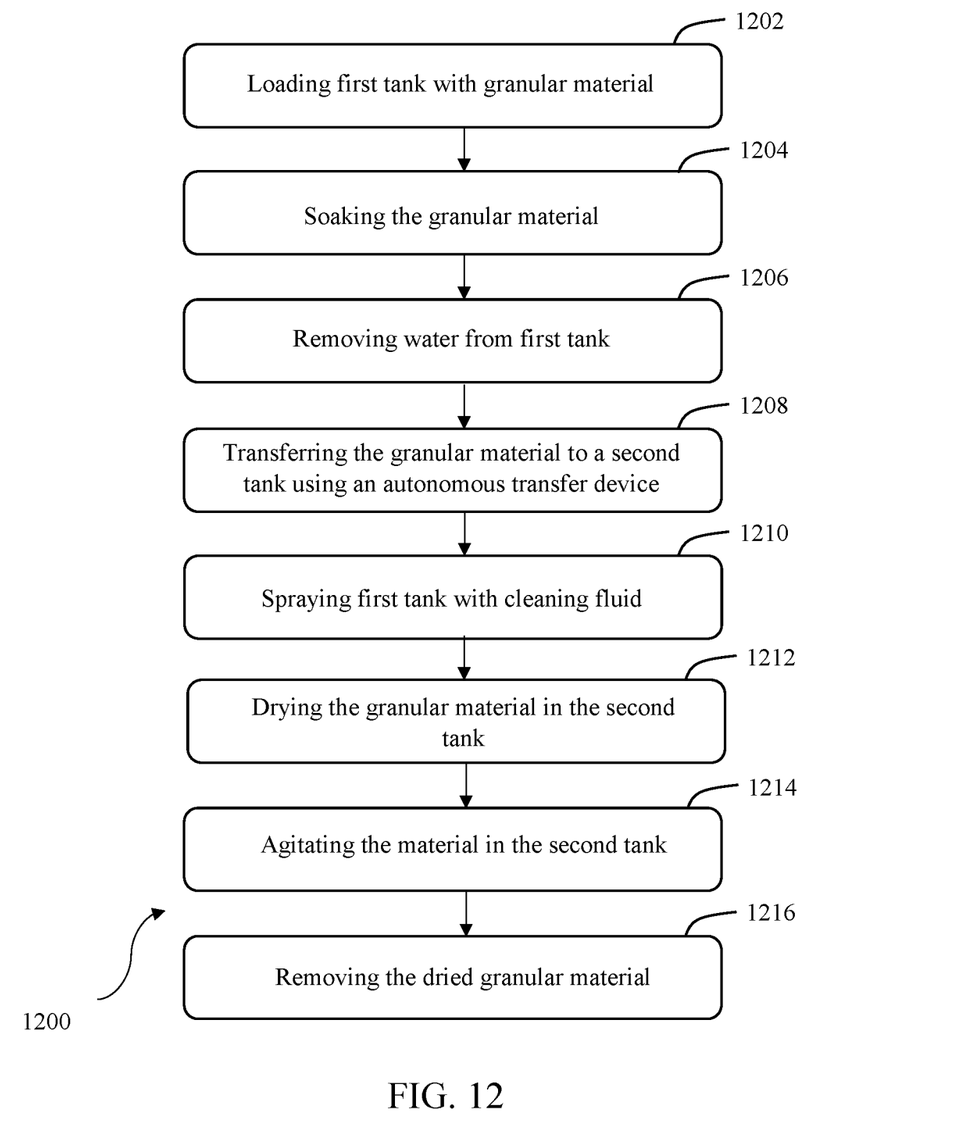
FIG. 12 depicts a flowchart of a method of malting a granular material in accordance with one embodiment.

FIG. 12 depicts a flowchart of a method 1200 of malting a granular material in accordance with one embodiment. Step 1202 involves loading a first tank with a granular material. This tank may be similar to the upper tank of 102 of FIG. 1. In some embodiments the granular material may be barley.

Step 1204 involves soaking the granular material. This process is known as steeping. The granular material may be soaked for a predetermined period of time. In the context of the present application, the term "predetermined period of time" in conjunction with soaking the granular material may refer to a number of minutes/hours or simply a period of time sufficient to achieve adequate soaking for malting purposes.

Step 1206 involves removing water from the first tank. Once the granular material has soaked for a predetermined period of time, the water may be removed by, for example, an actuating water valve or some other removal mechanism.

Step 1208 involves transferring the granular material to a second tank using a device. The second tank may be the lower tank 104 of FIG. 1, for example, and may generally be used for germination, kilning, and drying.

The transfer device may be similar to the grain transfer system 106 of FIGS. 1 and 4. Once the barley has been adequately soaked (i.e., steeped), the valve of the grain transfer system 106 may open to allow the steeped barley to enter the grain transfer system 106. To the control the rate of barley flow, the valve may completely or only partially open to allow barley to enter the grain transfer system 106 at a certain rate.

As mentioned previously, the valve may be electrically and/or mechanically activated by a remote control device. For example, if the sensors configured with the upper tank detect that the water is drained from the upper tank 102 (and therefore that steeping is complete), the control device may signal the valve to open to allow grain through the grain transfer system and into the lower tank. Similarly, the valve may be set to open/close on a timer or at predetermined times.

The barley may then flow through a plurality of transfer pipes such as the pipes 402 of FIG. 4. Using a plurality of pipes ensures a more even distribution of the barley as the barley enters the lower tank 104.

Step 1210 involves spraying the first tank with a cleaning fluid. The first tank may include a cleaning nozzle such as the cleaning nozzle 300 of FIG. 3. The spray nozzle may work on a closed circuit system and may spray water and/or cleaning chemicals or fluids into the first tank once the first tank is empty (e.g., once the water and grain are removed).

Step 1212 involves drying the granular material in the second tank. The second tank may include a false bottom floor such as the floor 504 of FIGS. 5 and 6. This floor may include a plurality of perforations such as the perforations 502 of FIGS. 5 and 6. These perforations allow heat and air to circulate through the second tank to dry the barley therein. Accordingly, the second tank may be operably connected to an HVAC system such as the HVAC system 116 of FIG. 1.

Step 1214 involves agitating the material in the second tank. Step 1214 may involve using an agitator such as the agitator 800 of FIGS. 8 and 9, for example.

Step 1216 involves removing the dried granular material from the second tank. The material may be removed by, for example, a grain removal device such as the grain removal auger 506 of FIGS. 5 and 6.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. An autonomous malting system, the system comprising:
   a first tank that includes:
      an ingress pipe for receiving water, and
      a material inlet for receiving a granular material to be steeped in water;
   a second tank positioned below the first tank; and
   an autonomous transfer device operably positioned between the first tank and the second tank for transferring the steeped granular material from the first tank to the second tank, wherein the transfer device includes a plurality of pipes extending from the first tank and each pipe of the plurality entering the second tank at a different location to evenly spread the transferred steeped granular material in the second tank.

2. The system of claim 1 further comprising an autonomous valve operably connected to the first tank for removing water from the first tank after a predetermined amount of time.

3. The system of claim 1 wherein the second tank includes a perforated floor portion.

4. The system of claim 3 further comprising at least one fan for pushing air through the perforated floor portion.

5. The system of claim 3 further comprising a heat exchanger providing heat through the perforated floor portion to dry the granular material in the second tank.

6. The system of claim 3 further comprising a grain removal auger positioned below the perforated floor portion.

7. The system of claim 1, further comprising an agitator assembly operably positioned in the second tank, the agitator assembly including:
   a vertical shaft;
   at least one arm extending horizontally from the vertical shaft; and
   at least one knife hanging from the at least one arm.

8. The system of claim 7, wherein the agitator assembly further includes at least one wire extending between two knives.

9. The system of claim 1 wherein the autonomous transfer device further includes a valve device configured to control the transfer of material from the first tank to the second tank.

10. The system of claim 1 further comprising a spray nozzle operably positioned with respect to the first tank for injecting at least one of water and cleaning chemicals into the first tank.

11. A method of malting a granular material, the method comprising:
   loading the first tank of claim 1 with a granular material;
   soaking the granular material for a predetermined period of time;
   transferring the granular material to the second tank of claim 1 using the autonomous transfer device of claim 1; and
   drying the granular material in the second tank.

12. The method of claim 11 further comprising agitating the granular material in the second tank using the agitator assembly of claim 7.

13. The method of claim 12 further comprising applying compressed air to the first tank.

14. The method of claim 11 further comprising removing the dried granular material from the second tank using a grain removal auger.

15. The method of claim 11, wherein drying the granular material in the second tank includes supplying heat to the second tank using a heat exchanger.

16. The method of claim 11 further comprising spraying the first tank with a cleaning fluid.

17. The method of claim 11 further comprising pushing air through a perforated floor of the second tank.

18. The method of claim 11 further comprising removing water from the first tank after soaking.

19. The system of claim 1 wherein the transfer device uses gravity to transfer the material from the first tank to the second tank.

* * * * *